J. A. Sinclair,
Flour Sieve.

No. 63,316. Patented Mar. 26, 1867.

Witnesses
Theo Tusche
J. A. Servis

Inventor:
Jas A Sinclair
Per Munn & Co
Attorneys

United States Patent Office.

JAMES A. SINCLAIR, OF WOODSFIELD, OHIO, ASSIGNOR TO HIMSELF AND J. T. JUDKINS AND W. HOLLISTER, OF SAME PLACE.

*Letters Patent No. 63,316, dated March 26, 1867.*

IMPROVED FLOUR SIFTER.

*The Schedule referred to in these Letters Patent and making part of the same.*

TO ALL WHOM IT MAY CONCERN:

Be it known that I, JAMES A. SINCLAIR, of Woodsfield, in the county of Monroe, and State of Ohio, have invented a new and improved Flour Sifter; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved machine for sifting flour, meal, or screening grapes, cherries, berries, grain, seeds, &c.; and it consists in the combination of the two cylinders, having lines of brushes winding spirally about them in opposite directions with the sliding drawer; in the combination of a removable screen or sieve with the sliding drawer; in making the sliding drawer in two parts hinged to each other at their side edges; and in the combination of the sliding drawer with the hopper and discharging spouts; the whole being constructed and arranged as hereinafter more fully described.

Figure 1:
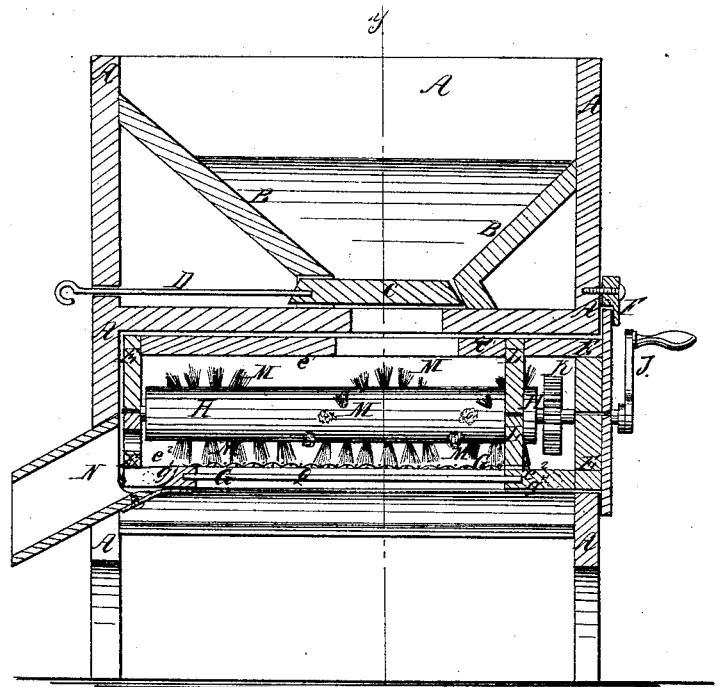
Figure 1 is a vertical longitudinal section of my improved sifter, taken through the line $x\ x$, fig. 2.
Figure 2:
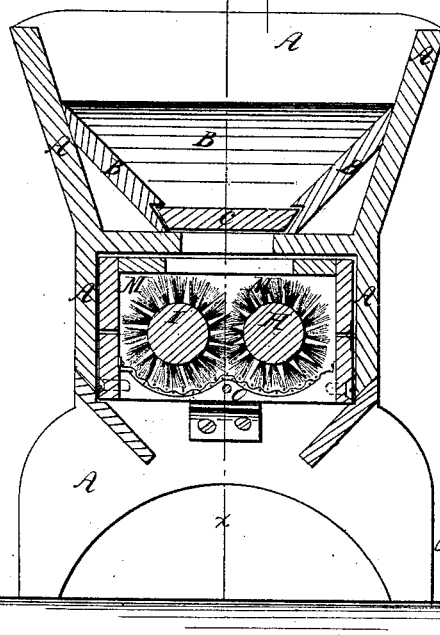
Figure 2 is a vertical cross-section of the same, taken through the line $y\ y$, fig. 1.

A is the box or frame of the sifter, the upper part of which is formed into a hopper, B; the bottom or discharging orifice of which is wholly or partially closed by the slide C, which is operated by the rod D passing out through the end of the box A, as shown in fig. 1, so that the flour or other substance being sifted or screened may be admitted to the sieve with any desired rapidity. E is a drawer which slides in and out through an opening in the end of the box A, and which is secured in place by the button F pivoted to the said box. The box E is made in two parts, $e^1$ and $e^2$, as shown in figs. 1 and 2, which parts are hinged to each other at their rear side edges; and the upper part or cover $e^1$ has a hole cut through it corresponding to the discharging orifice of the hopper B. G is the sieve or screen, the ends of which are securely attached to the end blocks $g^1$ and $g^2$, and which is removably secured in place by screws passing through the sides of the drawer E and into the said end blocks $g^1$ and $g^2$, so that the sieve may be readily changed for a finer or coarser one, as may be desired. H and I are cylinders, the journals of which revolve in bearings in the ends of the drawer E, as shown in fig. 1. J is a crank attached to the projecting end of the journal of one of the cylinders, as H, by which motion is communicated to said cylinder. Motion is communicated from the cylinder H to the cylinder I by gear-wheels, K, one of which is shown in fig. 1, attached to the end of each of said cylinders, and the teeth of which mesh into each other. L is a partition passing across the end of the drawer E, and which prevents the flour or other substance being sifted or screened from coming in contact with the gear-wheels K. M are brushes arranged in spiral lines around the cylinders H and I, which spiral lines wind in a different direction in the one cylinder from what they do in the other, so that the tendency of the said brushes may be to move the lumps and other substances that cannot pass through the sieve back to its rear end, where they escape through the spout N into a receptacle prepared for their reception. O is a wire or rod passing longitudinally across the middle part of the sieve G to support said middle part, and cause the parts of the sieve on each side of said rod O to take a semicircular shape so as to more nearly conform to the form of the cylinders H and I.

I claim as new, and desire to secure by Letters Patent—

1. The combination of the two cylinders H and I, having lines of brushes M winding spirally around them in opposite directions with the sliding drawer E, substantially as herein shown and described and for the purpose set forth.

2. The drawer E, consisting of two hinged parts, $e^1$ and $e^2$, with opening on its upper side registering with the discharge orifice of the hopper, and having at its bottom the semi-cylindrical sieve G swept by the spiral brushes M, and a passage at its rear opening into spout N, and constructed and operating substantially as described for the purpose specified.

3. The combination of the sliding drawer E with the box A, hopper B, and spout N, substantially as herein shown and described

JAMES A. SINCLAIR.

Witnesses:
   J. T. JUDKINS,
   W. W. JORDON.